May 10, 1932.  E. M. SHINKLE  1,857,408
STOP FOR ROTATING PARTS
Filed Feb. 21, 1929  2 Sheets-Sheet 1

Inventor
Edward M. Shinkle
By W. N. Roach
Attorney

May 10, 1932.   E. M. SHINKLE   1,857,408
STOP FOR ROTATING PARTS
Filed Feb. 21, 1929   2 Sheets-Sheet 2
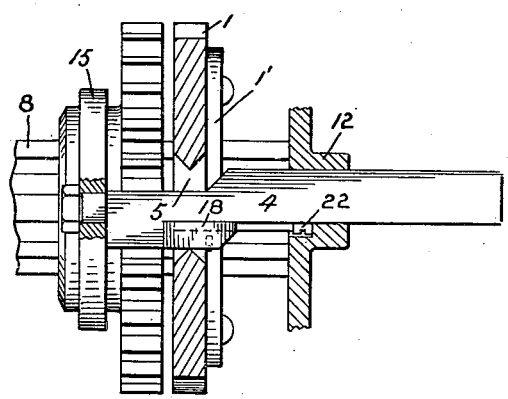
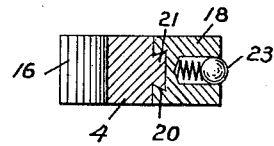
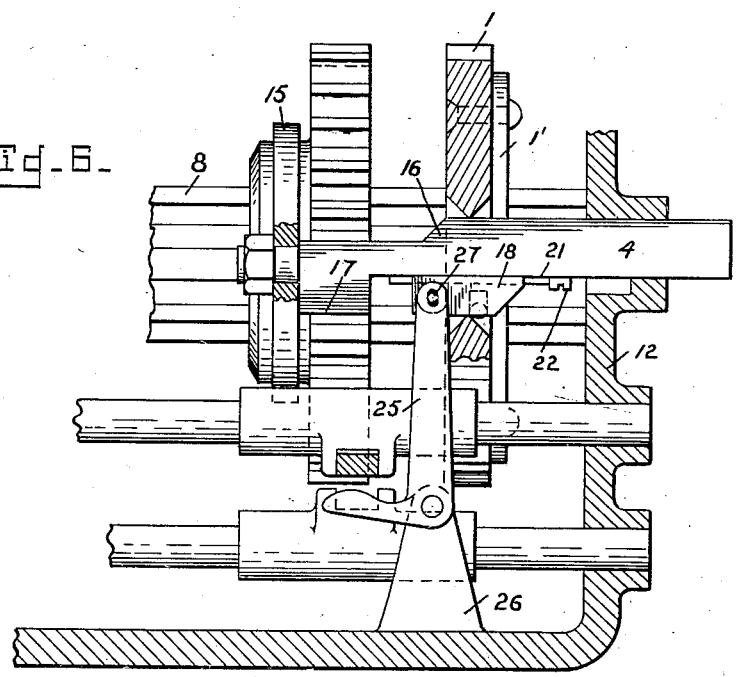
Inventor
Edward M. Shinkle
By W. N. Roach
Attorney Patented May 10, 1932

1,857,408

UNITED STATES PATENT OFFICE

EDWARD M. SHINKLE, OF HIGGINSPORT, OHIO

STOP FOR ROTATING PARTS

Application filed February 21, 1929. Serial No. 341,802.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The subject of this invention is a stop for rotating parts.

This invention relates generally to mechanism for preventing rotation of a driven member in one direction and more especially to means mounted adjacent a shaft, pinion or the like for preventing its rotation save in a given direction, that is, clockwise or counter-clockwise, as the case may be.

This invention constitutes an improvement in and further development of the invention disclosed in Patent No. 1,625,571, granted to me April 19, 1927.

The main objects of the invention are the provision of means prohibiting the movement of the pawl to operating position while the moving parts retain sufficient speed to cause damage, such means providing a simple and novel structure for rendering the device inoperative.

These objects are accomplished by providing an element movable with the control member but restrained from movement therewith during selective movements of such member.

With these and such other objects in view, as may hereinafter more fully appear, the invention resides in the novel arrangement and the combination of parts and in the details of construction hereinafter described and claimed, it being understood, however, that changes in the precise embodiment of the invention herein disclosed may be made within the scope of the claims without departing from the spirit of the invention.

In the accompanying drawings in which practical embodiments of the invention are disclosed by way of illustration:

Fig. 5 is a similar view showing the position assumed by the parts when the gears are shifted to reverse;

Fig. 6 is a fragmentary view in transverse section of another form of the device; and Fig. 7 is a detail sectional view taken on the line 7—7 of Fig. 3.

Figure 1:
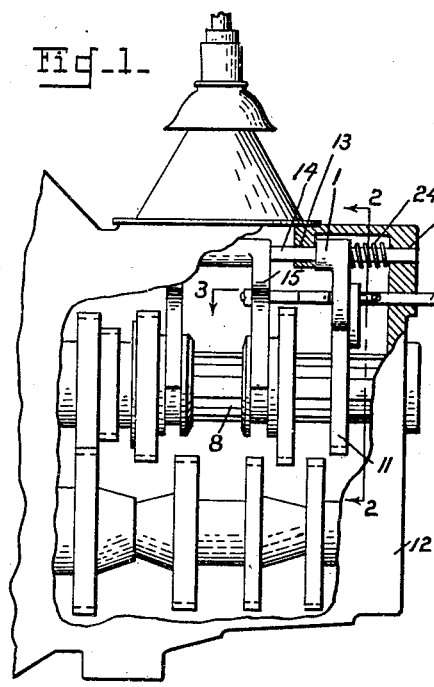
Fig. 1 is a vertical longitudinal view of an automobile transmission case, part of the side wall thereof being removed to expose the gears and illustrating a single embodiment of the invention, the parts of the transmission being in neutral position.
Figure 3:
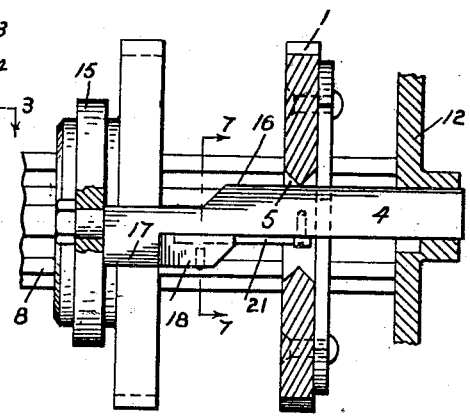
Fig. 3 is an enlarged sectional view taken on the line 3—3 of Fig. 1, the parts shown in the position assumed when the gears are shifted to first speed forward.
Figure 2:
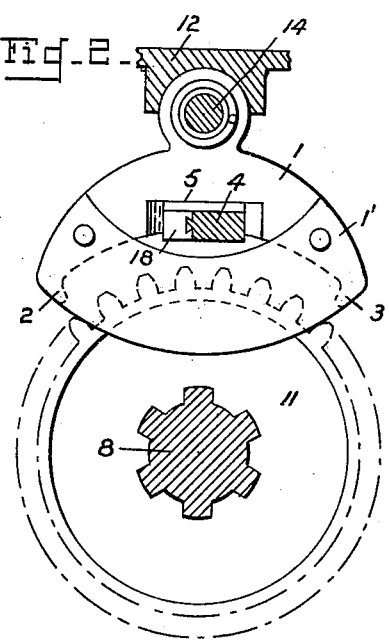
Fig. 2 is a detail sectional view taken on the line 2—2 of Fig. 1.

As will be seen from the appended claims, while for the purpose of convenience, the invention has been illustrated in connection with a transmission mechanism, the same is not so limited. The words used in the description should be considered in their descriptive and not in their limiting sense.

In the embodiments of the invention herein shown, the stop mechanism preferably comprises a pivotally mounted pawl 1 which may conveniently be formed with a pair of ratchet engaging teeth 2 and 3. To maintain the pawl 1 from pivotal movement in one direction, there is preferably employed a control bar 4 which, as illustrated, is adapted to pass through a slot 5 provided in the pawl.

In the particular construction here illustrated, pawl 1 is designed to cooperate with a gear 11 rigidly connected to the shaft 8 so as to rotate therewith. It will be understood that the pawl may be designed to coact with one of the transmission gears if so desired.

Referring to the specific application of the invention as a safety stop for automobiles, the transmission housing or case 12 is provided with a pair of spaced bearings 13—13 between which the pawl is pivotally mounted on a shaft 14. The bearings are preferably located adjacent to the rear wall of the housing or case 12 so that the pawl will not interfere with the movement of the movable gears of the transmission. The pawl is so mounted that its pivotal movement will be transverse of the casing 12 and its center of motion in line with the direction of movement of the shift fork preferably, though not necessarily, the fork 15.

The control bar 4 is preferably connected in any convenient manner to the fork 15 which is the fork controlling the shifting of the gears to first speed forward and reverse so as to be movable therewith. The bar 4 is formed with a laterally offset portion 16 on one side thereof and a laterally offset portion 17 on the other side thereof and adjacent its forward end. The offset portion 17 provides a rearwardly-facing shoulder against which a slidable element 18 is normally adapted to rest. The element 18 may conveniently be in the form of a block provided with the dove-tail groove 20 adapted to engage a tongue 21 formed on the side of the bar 4. A stop 22 is provided on the bar at the rear end of the tongue to retain the block in place and position the same, as will hereinafter appear. The block is also provided with a suitable detent 23 adapted to engage a wall of the slot in the pawl to arrest movement of the block in one direction for a purpose soon to appear.

The pawl 1 is provided with a frictional contact member or plate 1' adapted to engage the gear 11 and held in frictional contact therewith by suitable means such as the coil spring 24, the purpose of such frictional contact being to cause the pawl to swing in a direction opposite to the direction of rotation of the gear 11 so as to bring a pawl tooth into engagement with a tooth of the gear when the control bar 4 is set to permit the same.

Figure 4:
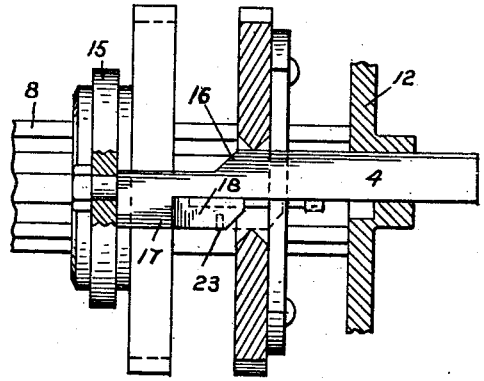
Fig. 4 is a similar view showing the position of the parts when the gears are in neutral position, and in dotted lines the position of the sliding element when the gears are returned to neutral position after having been shifted to reverse.

The operation of the improvement is as follows: With the gears in neutral position, as shown in Fig. 1, and in solid lines in Fig. 4, the control bar 4 will prevent movement of the pawl as long as the gears are rotating in a direction to cause forward movement of the vehicle but the pawl is free to operate to lock the parts against movement should a reverse movement of the gears take place. This same situation is maintained during all shifts of the gears to forward speed. When the gears are shifted to reverse position, the sliding element is carried with the control rod 4 and the detent 23 snaps past the side wall of the slot 5. With the parts in this position, as shown most clearly in Fig. 5, the pawl is prevented from movement in a direction to lock the gears against reverse movement but is free to move in a direction to lock the gears against forward movement. When the gears are again shifted to neutral, the detent 23 engages the wall of the slot 5, causing the element 18 to remain stationary at that point while the bar 4 moves with relation thereto. In this position, which is illustrated most clearly in dotted lines in Fig. 4, the pawl is locked against movement in either direction and the vehicle or the gears may therefore be moved in either direction at will. When the gears are again shifted from neutral position to first speed forward, the stop 22 contacts the rear end of the slidable element 18, forcing the detent past the side-wall of the slot and restoring the parts to their normal position.

In Fig. 6 is shown a modified structure designed to permit shifting of the slidable element 18 from its detained position even when the gear shift lever is thrown from neutral to second or third speed forward. For this purpose a bellcrank lever 25 is pivotally mounted on a bracket 26 secured to the gear casing or other convenient part, and has one arm connected to the slidable element 18 through means of a pin 27 engaged in a slot in said arm and the other arm positioned in the path of travel of the gear shift lever in shifting from neutral position to either second or third speed forward.

Having described the improvement and the operation thereof, I claim:

1. In a device of the character described, the combination with a rotating element, of a double ended pawl member pivotally mounted adjacent said element, means on said element adapted to be engaged by either end of said pawl, and means for positively positioning said pawl to prevent revolution of said element in one direction, said means including means cooperating therewith for selectively restraining the said pawl from operation.

2. In a device of the character described, the combination with a rotating element of a double ended pawl member pivotally mounted adjacent the said element, means on said element adapted to be engaged by either end of said pawl, means carried by said pawl for rotating the same in an opposite direction to the rotation of said element and means for positively positioning said pawl to prevent revolution of said element in one direction, including means cooperating therewith for restraining said pawl from operation.

3. In a device of the character described, the combintion with a rotating element of a double-ended pawl member pivotally mounted adjacent the said element, means on said element adapted to be engaged by either end of said pawl, and means on the pawl frictionally engaging the first named means for causing said pawl to be rotated in a direction opposite to the rotation of said element, and means for positively positioning said pawl to prevent revolution of said element in one predetermined direction, said positioning means including means cooperating therewith for restraining said pawl from operation.

4. In a device of the character described, the combination with a housing of a rotating element therein, a pawl pivotally connected to said housing, a toothed member connected to said element for rotation therewith, means for causing engagement of said pawl and said member when rotated in either direction, and means slidably engaging said pawl for controlling the direction of rotation of the pawl, including means cooperating therewith for rendering said pawl inoperative at will.

5. In a device of the character described, the combination with a housing, of a driven element therein, a pawl pivotally connected to said housing, a toothed wheel secured to said element, friction means for causing the engagement of said pawl and said wheel when rotated in either direction, a bar slidably engaging said pawl for controlling the direction of engagement thereof and means carried by the bar and cooperating therewith for rendering said pawl inoperative at will.

6. In a device of the character described, the combination with a housing, of a driven shaft therein, a rotatable pawl mounted in said housing, a ratchet wheel fastened to said shaft, means for causing the engagement of said pawl and said wheel and means having a plurality of oppositely disposed stop surfaces slidably engaging said pawl for preventing the rotation thereof in a predetermined direction, one of said stop faces movable with respect to said pawl engaging means for rendering the pawl inoperative.

7. In a device of the character described, the combination with a housing, of a rotatable element therein, a rotatable pawl, cooperating bearing surfaces on said pawl and housing, a toothed member secured to said element, means for causing the rotation of said pawl in a direction opposite the rotation of said member, and means for selectively preventing the rotation of said pawl in either direction, including means cooperating therewith for rendering the pawl inoperative at will.

8. In a device of the character described, the combination of a gear transmission and a stop mechanism adapted to operate automatically to oppose in either direction of rotation, the operation of the transmission in a direction other than that for which the gears are set and a control member for said stop mechanism including means carried by the control member and cooperating therewith for rendering the stop mechanism inoperative.

9. In a device of the character described, the combination of a gearing transmission, including a gear shift, a stop mechanism adapted to operate automatically with operation of the gear shift to oppose in either direction of rotation, the operation of the transmission in a direction other than that for which the gears are set and means cooperating therewith to release the gears to movement in either direction.

10. In a device of the character described, the combination of a transmission having gears, and selective gear shift means, of a stop mechanism adapted to restrain in either direction all rotational movement of the transmission gears in a direction other than the direction for which the gears are set and to release the gears to movement in both directions, said mechanism being controlled by means actuated by the gear shifting means when shifting to any selected gear position.

11. In a device of the character described, the combination with a rotatable element, of a stop member for engagement with the rotatable element, means interposed between the member and element for actuating the member to engage the element, and a control for the member operable to free the element to rotate in a selected direction and means cooperating with the control to free the element to rotate in either direction.

12. In a device of the character described, the combination with a rotatable element, of a stop member for engagement with the rotatable element, and a control bar for the stop member including means carried by the bar and movable thereon for rendering the stop member inoperative.

13. In a device of the character described, the combination with a rotatable element, of a stop member for engagement with the rotatable element, means interposed between the member and element for actuating the member to engage the element, and a control bar for the stop member including means carried by the bar and movable thereon for rendering the stop member inoperative.

14. In a device of the character described, the combination with a rotatable element, of a stop member for engagement with the rotatable element, a control for the member operable to free the element to rotate in a selected direction, means cooperating with the control for freeing the element to rotate in either direction and means operable to release said means.

15. In a device of the character described, the combination with a rotatable element, of a stop member for engagement with the rotatable element, a control for the stop member, means cooperating with the control for rendering the stop member inoperative, and means operable to release said means.

EDWARD M. SHINKLE.